United States Patent [19]
Hiroki

[11] Patent Number: 5,251,671
[45] Date of Patent: Oct. 12, 1993

[54] PRESSURE CONTROL VALVE ASSEMBLY WITH FEATURE OF EASY ADJUSTMENT OF SET LOAD

[75] Inventor: Kazuchika Hiroki, Kanagawa, Japan

[73] Assignee: Atsugi Unisia Corporation, Japan

[21] Appl. No.: 918,807

[22] Filed: Jul. 23, 1992

Related U.S. Application Data

[63] Continuation of Ser. No. 609,745, Nov. 6, 1990, abandoned.

[30] Foreign Application Priority Data

Nov. 7, 1989 [JP] Japan ............... 1-130069[U]

[51] Int. Cl.⁵ .................................. F15B 13/044
[52] U.S. Cl. ........................ 137/625.65; 91/433
[58] Field of Search ................. 137/625.65; 91/433

[56] References Cited

U.S. PATENT DOCUMENTS

| | | | |
|---|---|---|---|
| 4,310,143 | 1/1982 | Determan | 137/625.65 X |
| 4,320,782 | 3/1982 | Pauliukonis . | |
| 4,373,699 | 2/1983 | Leiberich . | |
| 4,396,037 | 8/1983 | Wilcox | 137/625.65 |
| 4,478,250 | 10/1984 | Lukasczyk et al. | 137/625.65 |
| 4,632,358 | 12/1986 | Orth et al. . | |
| 4,643,225 | 2/1987 | Imhof | 137/625.65 X |
| 4,657,102 | 4/1987 | Kanazawa et al. . | |
| 4,720,790 | 1/1988 | Miki et al. . | |
| 4,722,364 | 2/1988 | Kubach et al. | 137/625.65 |
| 4,741,365 | 5/1988 | Van Ornum | 137/625.65 |
| 4,778,023 | 10/1988 | Sugasawa . | |
| 4,926,954 | 5/1990 | Ataka et al. . | |
| 4,969,487 | 11/1990 | Suzuki et al. | 137/625.65 |

FOREIGN PATENT DOCUMENTS

| | | | |
|---|---|---|---|
| 2506864 | 8/1976 | Fed. Rep. of Germany . | |
| 63-208910 | 8/1988 | Japan | 137/625.65 |
| 63-231003 | 9/1988 | Japan . | |
| 1-261581 | 10/1989 | Japan | 137/625.65 |
| 1125102 | 8/1968 | United Kingdom . | |
| 1251016 | 10/1971 | United Kingdom . | |
| 1548586 | 7/1979 | United Kingdom . | |
| 2037951 | 7/1980 | United Kingdom . | |
| 2076125 | 11/1981 | United Kingdom . | |

Primary Examiner—Gerald A. Michalsky

[57] ABSTRACT

A pressure control valve assembly is provided with a valve spool which is formed integrally with a plunger of an electromagnetic solenoid so that the electromagnetic force generated by the solenoid is directly active on the valve spool. By integration of the valve spool and the plunger of the solenoid, axial length can be reduced. Furthermore, with this construction, the set springs can be axially oriented outside of the solenoid to make it easy to adjust the set load to be exerted on the valve spool.

10 Claims, 2 Drawing Sheets

PRESSURE CONTROL VALVE ASSEMBLY WITH FEATURE OF EASY ADJUSTMENT OF SET LOAD

This application is a continuation of application Ser. No. 07/609,745 filed Nov. 6, 1990, now abandoned.

BACKGROUND OF THE INVENTION

1. Field of the Invention

The present invention relates generally to a pressure control valve, which is useful in an automotive power steering system or other industrial facilities.

2. Description of the Background Art

A pressure control valve of this type has been disclosed in Japanese Patent First (unexamined) Publication (Tokkai) Showa 63-231003, for example. Such a conventional pressure control valve has a valve bore in a valve body. A valve spool is disposed for thrusting movement within the valve bore for adjusting fluid flow rate through a supply line, output line and drain line. The valve spool is associated with an electromagnetic solenoid to be driven in a direction for increasing the output pressure in the output line. The valve spool is also associated with a feedback means for providing feedback pressure for returning to the initial position. Furthermore, the valve spool is normally biased toward an initial position by means of a set spring.

In such a conventional pressure control valve, the force for driving the valve spool is generated in the solenoid and transmitted to the valve spool via an actuation rod. Such construction clearly limits reduction of the axial length of the valve assembly. In addition, in the prior proposed construction, the set spring is disposed between the valve spool and a casing of the solenoid. Therefore, in order to adjust the set pressure, an axial position of the solenoid casing has to be adjusted. This makes adjustment of the set load difficult and complicated.

SUMMARY OF THE INVENTION

It is an object of the present invention to provide a pressure control valve which can solve the problems in the prior art, as set forth above.

Another more specific object of the present invention is to provide a pressure control valve which can permit reduction of the axial length of the pressure control valve assembly.

A further object of the invention is to provide a pressure control valve in which it is easy to adjust the set load.

In order to accomplish aforementioned and other objects, a pressure control valve assembly, according to the present invention, is provided with a valve spool which is formed integrally with a plunger of an electromagnetic solenoid so that the electromagnetic force generated by the solenoid is directly active on the valve spool. By integration of the valve spool and the plunger of the solenoid, axial length can be reduced. Furthermore, with this construction, the set springs can be axially oriented outside of the solenoid to make it easy to adjust the set load to be exerted onto the valve spool.

According to the present invention, a pressure control valve assembly comprises:

a valve housing defining therein an axially extending valve bore;

a valve spool disposed within the valve bore for thrusting movement therewithin for adjusting output pressure according to the axial position thereof;

an electromagnetic actuator for driving the valve spool for causing axial movement of the latter to increase the output pressure in active state;

a mechanical set spring constantly exerting spring force for biasing the valve spool in a direction to cause axial movement of the valve spool to decrease the output pressure;

a plunger associated with the electromagnetic actuator for causing axial shifting of the valve spool. The plunger being formed integrally with the valve spool.

The set spring may be axially oriented outside of the electromagnetic actuator for permitting external adjustment of the set force. The set spring may be associated with an end plug which is threaded to the valve housing for adjusting the set force of the set spring.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
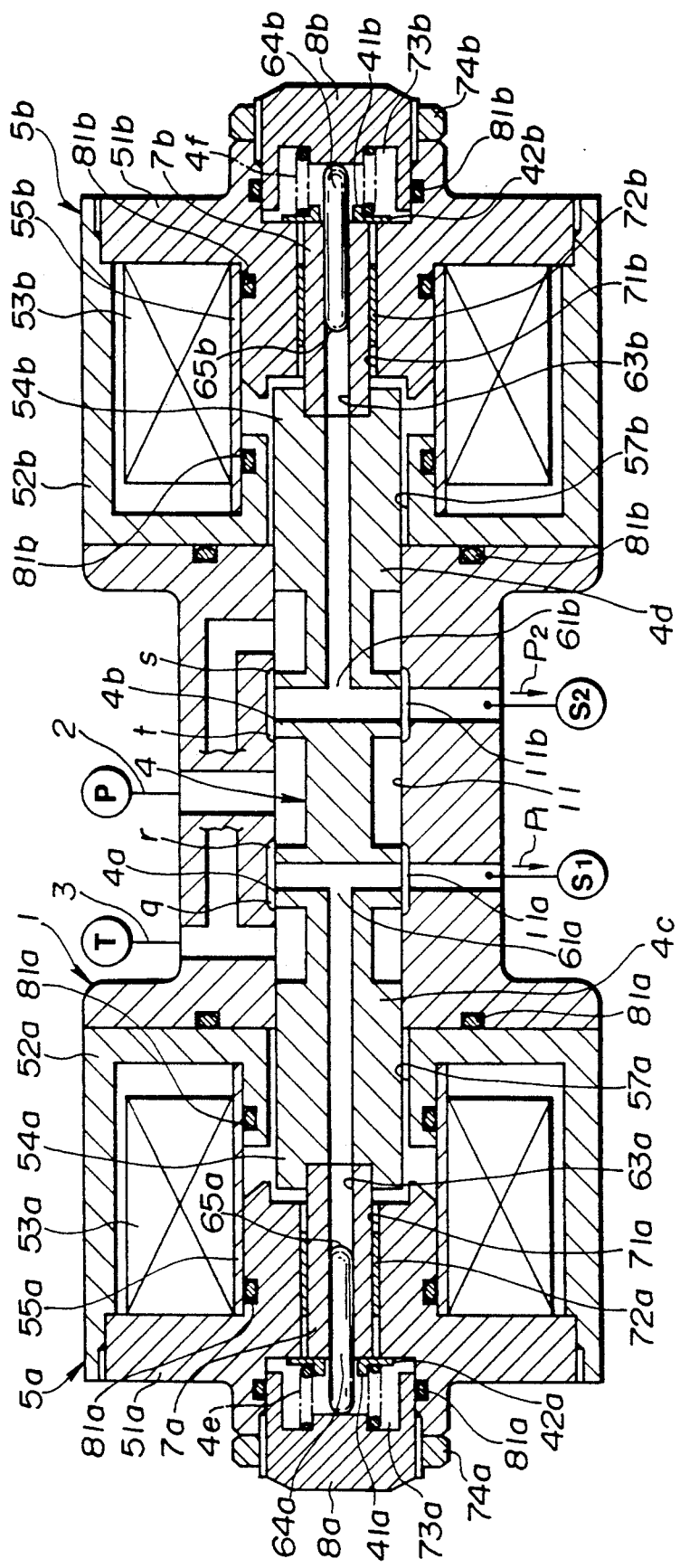
FIG. 1 is a section of the preferred embodiment of a pressure control valve according to the present invention.

Referring now to the drawings, particularly to FIG. 1, the preferred embodiment of a pressure control valve assembly, according to the present invention, is connected to a first output circuit $S_1$ and a second output circuit $S_2$ for supplying output pressures $P_1$ and $P_2$. The output pressures $P_1$ and $P_2$ output from the pressure control valve assembly are utilized for controlling a rear wheel steering system, for example. For instance, in the rear wheel steering system, right hand steering of the rear wheels is performed by increasing the output pressure in the first output circuit $S_1$. On the other hand, when the output pressure in the second output circuit $S_2$ is increased, left hand steering is performed at the rear wheels. As is known, the rear wheel steering control is performed in response to a steering operation of the front wheels. Magnitude and direction will be determined by taking various control parameters into account. Such a rear wheel steering control system has been disclosed in U.S. Pat. Nos. 4,778,023, issued on Oct. 18, 1988, 4,926,954, issued on May 22, 1990, 4,657,102, issued on Apr. 14, 1987, 4,720,790, issued on Jan. 19, 1988, and so forth. The disclosure of these previously proposed four wheel steering systems incorporating rear wheel steering control are herein incorporated by reference for the sake of disclosure.

As shown in FIG. 1, the preferred embodiment of a pressure control valve assembly, according to the present invention, includes a valve body 1. The valve body 1 is formed with an axially extending valve bore 11. The valve bore 11 is formed with first and second output ports 11a and 11b. The first and second output ports 11a and 11b are respectively connected to first and second output lines $S_1$ and $S_2$. At an axially intermediate position between the first and second output ports 11a and 11b, a supply line 2 is communicated with the valve bore 11. On the other hand, at an axial position outside of the first and second output ports 11a and 11b, a drain line 3 is communicated. The supply line 2 is connected to a fluid pump P acting as the fluid pressure source. On the other hand, the drain line 3 is connected to a reservoir tank T for returning the pressurized fluid thereto. As can be appreciated, the fluid pressure in the drain line 3 and the reservoir tank T corresponds to the atmospheric pressure.

A valve spool 4 is disposed within the valve bore 11 in a manner for thrusting movement aligned with the axis of the valve bore. The valve spool 4 is formed with first and second lands 4a and 4b. The first land 4a forms variable orifices q and r with the edges of the first output port 11a. On the other hand, the second land 4b forms variable orifices s and t together with the axial edges of the second output port 11b. Lands 4c and 4d are also formed at both axial ends of the valve spool 4.

A pair of actuator assemblies 5a and 5b are provided at opposing axial ends of the valve spool 4 so as to control the position of the valve spool within the valve bore. As can be appreciated, according to the position of the valve spool 4, fluid communication between the supply line 2 and the output ports 11a and 11b, and between the output ports and the drain line 3 is selectively established by selectively opening variable orifices q, r, s and t. The actuator assemblies 5a and 5b have actuator casings 52a and 52b which are fitted onto axial ends of the valve body 1. A liquid-tight seal between the actuator casings 52a and 52b and the axial ends of the valve body 1 is established by means of seal rings 81a and 81b. Axial ends of the actuator casings 52a and 52b are closed by solenoid bodies 51a and 51b. Electromagnetic coils 53a and 53b are respectively disposed with annular chambers defined in the actuator casings 52a and 52b. Magnetically non-conductive or insulative sleeves 55a and 55b are disposed between the inner periphery of the electromagnetic coils 53a and 53b and the associated peripheral surfaces of the actuator casings 52a and 52b and solenoid bodies 51a and 51b.

The actuator casing 52a and 52b defines axial bores 57a and 57b having slightly greater diameters than that of the valve bore 11. Axial end portions 54a and 54b of the valve spool 4 are extended into the axial bores 57a and 57b. The axial end portions 54a and 54b of the valve spool 4 serves a plungers of the electromagnetic actuators. To respective axial ends of the axial end portions 54a and 54b, essentially cylindrical stopper members 7a and 7b, which are formed of magnetically non-conductive or insulative material, are rigidly fitted. The stopper members 7a and 7b extend into through openings 71a and 71b formed through the solenoid bodies 51a and 51b. For permitting axial movement of the stopper members 7a and 7b with respect to the through openings 71a and 71b, bushings 72a and 72b are disposed between the outer periphery of the stopper members and the inner periphery of the through openings. The axially outer ends of the through openings 71a and 71b open to larger diameter bores 73a and 73b. The outer ends of the larger diameter bores 73a and 73b are closed by adjustable plugs 8a and 8b which are threadingly engaged with the solenoid body 51a and 51b. By this, annular set spring receptacle chambers 73a and 73b are defined to receive therein set springs 4e and 4f. Axial inner ends of the set springs 4e and 4f are seated on retainers 41a and 41b with spring seat flanges 42a and 42b. Lock nuts 74a and 74b are also engaged with the adjustable plugs 8a and 8b.

The stopper members 7a and 7b are formed with first and second piston bores 63a and 63b. First and second pilot pistons 64a and 64b with rounded ends are thrustingly disposed within the first and second piston bores 63a and 63b. The first and second piston bores 63a and 63b are oriented in alignment with first an second feedback bores 61a and 61b which is in communication with the first and second output ports 11a and 11b. Therefore, the fluid pressures at respective first and second output ports 11a and 11b are exerted on respective of inner ends 65a and 65b of the first and second pistons 64a and 64b.

As can be appreciated, the solenoid coils 53a and 53b are energized and deenergized by driver current supplied from a control unit which governs the magnitude and direction of the pressure difference between the first and second output lines $S_1$ and $S_2$. The pressure difference may effect works, such as rear steering control and so forth.

Operation of the preferred embodiment of the pressure control valve assembly, according to the present invention, will be discussed herebelow.

As long as no driver current is supplied to both of the solenoid coils 53a and 53b, both of solenoid coils are maintained at deenergized state. As a result, both end portions 54a and 54b of the valve spool 4, which serve as plungers, are free from electromagnetic force of the solenoid coils 53a and 53b. In this condition, balance of spring forces of the set springs 4e and 4f is established at the neutral position of the valve spool 4. At this position, fluid communication between the supply line 2 and the first and second output ports $S_1$ and $S_2$ is maintained via variable orifices r and t. On the other hand, fluid communication between the first and second output ports 11a and 11b and the drain line 3 is established via the variable orifices q and s.

Therefore, the fluid pressures in the first and second output lines $S_1$ and $S_2$ are equal to each other. Therefore, when the first and second output lines are connected to the rear wheel steering system, the rear wheels are maintained at neutral position.

Figure 2:
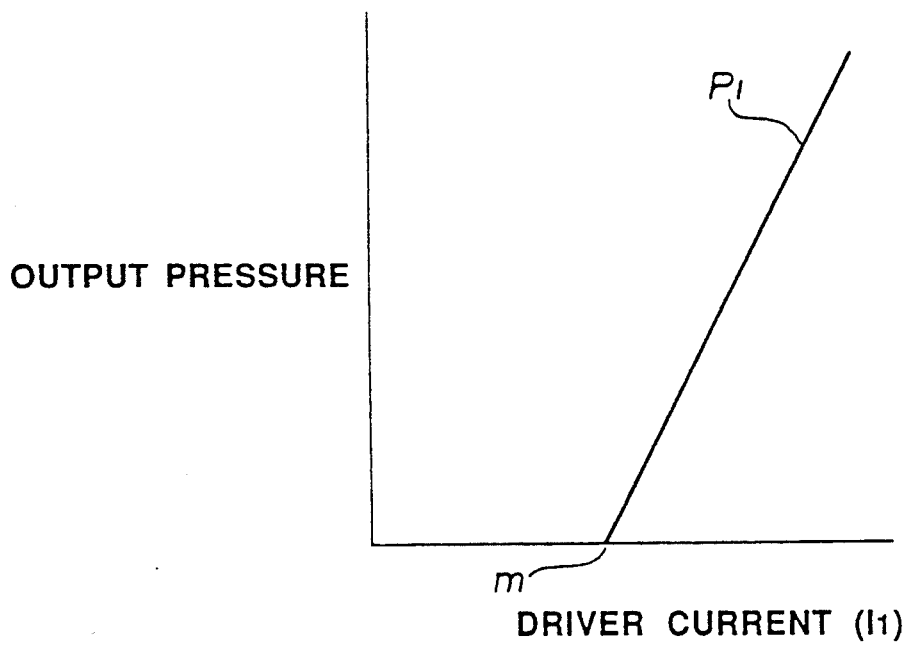
FIG. 2 is a chart showing variation of the output pressure in relation to control current to be supplied to a solenoid.

When the driver current is supplied to the solenoid coil 53a of the first actuator assembly 5a, the solenoid coil is energized to draw the axial end portion 54a. So long as the magnetic drawing force of the solenoid coil 54a is smaller than the spring force of the set spring 4e, the valve spool 4 stays at the neutral position despite of exertion of the magnetic force. When the magnetic force of the solenoid coil 53a becomes greater than the spring force (see point "M" in FIG. 2), the valve spool 4 together with the stopper member 7a move against the spring force of the coil spring 4e.

According to the shifting of the valve spool 4, the fluid path areas in the variable orifices r and s are increased. At the same time, the fluid path areas in the variable orifices q and t are progressively reduced. Therefore, greater flow rate of the pressurized fluid is introduced into the first output line $S_1$. On the other hand, fluid communication between the supply line 2 and the second output line $S_2$ is substantially blocked. Therefore, higher fluid pressure is supplied to the first output line $S_1$ than that in the second output line $S_2$.

The increased fluid pressure at the first output port 11a is fed back into the feedback bore 63a. The increased fluid pressure is thus exerted onto the first pilot piston 64a. Then, the increased fluid pressure is exerted on the adjustable plug 8a. The force thus serves as reacting force to push back the valve spool 4. Therefore, the axial movement of the valve spool 4 is terminated. Therefore, magnitude of axial shifting of the valve spool 4 becomes proportional to the magnitude of driver current.

Similar but opposite operation is taken place by applying the driver current to the solenoid coil 53b. Therefore, fluid pressure in the second output line $S_2$ is increased in a magnitude proportional to the magnitude of driver current applied to the solenoid coil 53b, just as the output pressure P1 in the first output line S1 was increased in a magnitude proportional to the magnitude of the driver current (See FIG. 2).

For adjusting the set load, the lock nuts 74a and 74b are loosened in order to enable the adjustable plugs 8a and 8b to be rotated. In this condition, if the adjustable plugs 8a and 8b are rotated in a further tightening direction, the set load on the set spring is increased. On the other hand, if the adjustable plugs 8a and 8b are rotated in a loosening direction, the set load can be reduced.

While the present invention has been discussed hereabove in terms of the preferred embodiment of the invention, the invention should not be appreciated to be restricted to the shown embodiment. The invention can be embodied in various fashions. Therefore, the invention should be interpreted to include all possible embodiments and modifications which can be embodied without departing from the principle of the invention set out in the appended claims.

What is claimed is:

1. A pressure control valve assembly comprising:
   a valve housing defining therein an axially extending valve bore, said valve housing having an inlet port in communication with a pressurized fluid source and said valve bore for introducing pressurized fluid from said pressurized fluid source into said valve bore, and an outlet port in communication with a load and said valve bore for feeding said pressurized fluid to said load;
   a valve spool movably disposed within said valve bore for selectively establishing and blocking fluid communication between said valve bore and said outlet port and for adjusting output pressure according to the axial position thereof, said valve spool defining therein a feedback chamber in communication with said outlet port for introducing fluid pressure discharged from said outlet port;
   an electromagnetic actuator, responsive to an electric control signal for driving said valve spool to cause axial movement of said valve spool from a neutral position to adjust the output pressure in response to said control signal;
   a plunger, associated with said electromagnetic actuator, for causing axial movement of said valve spool, said plunger being formed integrally with said valve spool;
   pilot piston means slidably disposed in said feedback chamber on an end of which the fluid pressure in said feedback chamber acts; and
   mechanical set spring means including a spring and a spring force adjusting member, the spring serving to constantly exert a spring force on said plunger for biasing said valve spool and for positioning said valve spool at the neutral position, the spring force adjusting member being arranged to adjust the spring force of the spring exerted on the plunger and acting on said pilot piston means to restrict sliding motion of said pilot piston means in an active direction of the fluid pressure in said feedback chamber for providing a reaction force against said fluid pressure in said feedback chamber to act on said valve spool to be urged to a position where a balance between a actuation force of said electromagnetic actuator and the reaction force is established for determining the output pressure at said outlet port.

2. A pressure control valve as set forth in claim 1, wherein the spring force adjusting member of said mechanical set spring force means is arranged outside said electromagnetic actuator, the spring being disposed between the spring force adjusting member and said plunger.

3. A pressure control valve as set forth in claim 2, wherein the spring force adjusting member is rotatably secured to said valve housing for adjusting a spring force of the spring.

4. A pressure control valve as set forth in claim 2, further comprising a stopper member which is formed of magnetically non-conductive material, the stopper member being interposed between the spring and the plunger.

5. A pressure control valve as set forth in claim 4, wherein said stopper member includes a through piston bore therein into which said pilot piston means is inserted so that an end of the pilot piston means engages the spring force adjusting member and the fluid pressure in said feedback chamber acts on the other end.

6. A pressure control valve as set forth in claim 4, further comprising a spring seat which is disposed between the spring and the stopper.

7. A pressure control valve assembly comprising:
   a valve housing defining therein an axially extending valve bore, said valve housing having an inlet port in communication with a pressurized fluid source and said valve bore for introducing pressurized fluid from said pressurized fluid source into said valve bore, a first outlet port in communication with a first load and said valve bore for feeding said pressurized fluid to said first load, and a second outlet port in communication with a second load and said valve bore for feeding said pressurized fluid to said second load;
   a valve spool movably disposed within said valve bore for selectively establishing and blocking fluid communication between said valve bore and said first and second outlet ports and for adjusting output pressure according to the axial position thereof, said valve spool defining therein a first feedback chamber in communication with said first outlet port for introducing fluid pressure discharged from said first outlet port; and a second feedback chamber in communication with said second outlet port for introducing fluid pressure discharged from said second outlet port;
   a first electromagnetic actuator, responsive to an electric control signal, for driving said valve spool from a neutral position for determining the axial position of said valve spool relative to said first outlet port;
   a second electromagnetic actuator, responsive to an electrical control signal, for driving said valve spool from a neutral position for determining the axial position of said valve spool relative to said second outlet port;
   first and second plungers associated with said first and second electromagnetic actuators for causing axial movement of said valve spool, said plungers being formed integrally with said valve spool;

first and second pilot piston means slidably disposed in respective said first and second feedback chambers on ends of which the fluid pressure in respective said first and second feedback chambers acts; and mechanical set spring means including a spring and a spring force adjusting member, the spring serving to constantly exert a spring force on said first and second plungers for biasing said valve spool and for positioning said valve spool at the neutral position, the spring force adjusting member being arranged to adjust the spring force of the spring exerted on said first and second plungers and acting on said pilot piston means to restrict sliding motion of said pilot piston means in an active direction of the fluid pressure in said feedback chamber for providing a reaction force against said fluid pressure in said first and second feedback chambers to act on said valve spool to be urged to a position where a balance between an actuation force of said first and second electromagnetic actuators and the reaction force is established for determining the output pressure at said outlet port.

8. A pressure control valve assembly comprising:

a valve housing defining therein an axially extending valve bore, said valve housing having an inlet port in communication with a pressurized fluid source and said valve bore for introducing pressurized fluid from said pressurized fluid source into said valve bore, an outlet port in communication with a load and said valve bore for feeding said pressurized fluid to said load, and a drain port in communication with a reservoir tank and said valve bore for returning said pressurized fluid to the reservoir tank;

a valve spool disposed within said valve bore, movable within a range from first and second valve positions, the first valve position being to establish fluid communication between the outlet port and the drain port, the second valve position being to establish fluid communication between the inlet port and the outlet port, as said valve spool is moved from the first to second valve positions, a degree of the fluid communication between the inlet port and the outlet port being modified for determining pressure output from the output port;

a feedback chamber defined in said valve spool in communication with said outlet port;

an electromagnetic actuator, responsive to an electric control signal for driving said valve spool to cause axial movement of said valve spool from the first valve position toward the second valve position for modifying the output pressure according to a position within the range from first to second valve positions;

a plunger, associated with said electromagnetic actuator, for causing axial movement of said valve spool, said plunger being formed integrally with said valve spool;

pilot piston means slidably disposed in said feedback chamber such that the fluid pressure in said feedback chamber acts on a first end thereof; and mechanical set spring means including a spring and a spring force adjusting member, the spring being arranged to constantly exert a spring force on said plunger for biasing said valve spool and for positioning said valve spool at the first valve position, the spring force adjusting member being arranged to adjust the spring force of the spring exerted on the plunger and acting on a second end of said pilot piston means opposite the first end thereof to restrict sliding motion of said pilot piston means so as to provide a reaction force against said fluid pressure in said feedback chamber to act on said valve spool to be urged to a position where a balance between an actuation force of said electromagnetic actuator and the reaction force is established for determining the output pressure at said outlet port.

9. A pressure control valve assembly as set forth in claim 8, wherein the spring is disposed between the spring force adjusting member and the plunger, the spring force adjusting member engaging with the pilot piston so that the spring force adjusting member is rotated to modify the spring force of the spring actin on said plunger.

10. A pressure control valve assembly as set forth in claim 9, wherein the spring force adjusting member is threaded to said valve housing such that the rotation of the spring force adjusting member causes axial movement thereof for modifying the spring force.

* * * * *